(12) United States Patent
Mallozzi

(10) Patent No.: US 7,873,559 B2
(45) Date of Patent: Jan. 18, 2011

(54) FINANCIAL SYSTEM THAT PROVIDES INVESTMENT FUNDS AND A DEATH BENEFIT

(75) Inventor: James J. Mallozzi, Avon, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 0 days.

(21) Appl. No.: 12/536,558

(22) Filed: Aug. 6, 2009

(65) Prior Publication Data

US 2009/0299913 A1 Dec. 3, 2009

Related U.S. Application Data

(62) Division of application No. 10/701,945, filed on Nov. 4, 2003, now Pat. No. 7,580,879.

(60) Provisional application No. 60/423,799, filed on Nov. 5, 2002.

(51) Int. Cl.
*G06Q 40/00* (2006.01)
(52) U.S. Cl. .................................... 705/36 R; 705/37
(58) Field of Classification Search ............... 705/36 R, 705/35, 4, 39, 37, 26, 1.1, 38, 40, 30, 36 T
See application file for complete search history.

(56) References Cited

U.S. PATENT DOCUMENTS

| | | | |
|---|---|---|---|
| 4,839,804 A * | 6/1989 | Roberts et al. ............ | 705/36 R |
| 5,864,685 A | 1/1999 | Hagan | |
| 6,275,807 B1 | 8/2001 | Schirripa | |
| 7,216,100 B2 * | 5/2007 | Elliott ...................... | 705/36 R |
| 2002/0156709 A1 | 10/2002 | Andrus et al. | |
| 2003/0018563 A1 * | 1/2003 | Kilgour et al. ............. | 705/37 |
| 2004/0030589 A1 * | 2/2004 | Leisher et al. ............. | 705/4 |
| 2004/0078244 A1 * | 4/2004 | Katcher ..................... | 705/4 |

OTHER PUBLICATIONS

Anonymous "Reynolds Metals Co. Announces Sale of Common Stock by Pension Fund" Sep. 20, 1983, PR Newswire, NYPR55.*
Philbrick, William C. "The Paving of Wall Street in Eastern Europe: Establishing the Leagal Infrastructure for Stock Markets in the Formerly Centrally Planned Economies" Winter 1994, Law and Policy in the International Business, 25, N2, 565-608.*
Nager, Ross et al. "Significant Recent Developments in Estate Planning (Part 3)" Dec. 1994, Tax Advisor, 25, 12, 723 (13).*
Anonymous "Simulation Sciences Announces Completion of Follow on Stock Offering" Nov. 20, 1997, Businesswire.*

* cited by examiner

*Primary Examiner*—Kelly Campen
(74) *Attorney, Agent, or Firm*—Howard IP Law Group, PC

(57) ABSTRACT

A method and system is disclosed for managing funds within separate accounts. The invention permits a distributor to market and an investor to purchase a single product that combines the benefits of a family of funds with the protection element of a death benefit or living benefit. To create the product, a legal entity issues an instrument typically stock comprised of a common stock and a preference stock having beneficial rights. The holder of a beneficial right controls the investment allocations over funds within separate accounts. The value of the preferred shares will be based on the value of underlying shares invested in separate account funds. The separate accounts are not available to satisfy the company's general or common stock obligations.

20 Claims, 12 Drawing Sheets

FINANCIAL SYSTEM THAT PROVIDES INVESTMENT FUNDS AND A DEATH BENEFIT

CROSS-REFERENCE TO RELATED APPLICATIONS

This application is a divisional application of U.S. patent application Ser. No. 10/701,945 entitled FINANCIAL SYSTEM THAT PROVIDES INVESTMENT FUNDS AND A DEATH BENEFIT, filed Nov. 4, 2003, which claims the benefit under 35 U.S.C. 119 (e) of U.S. Provisional Application No 60/423,799, filed Nov. 5, 2002, the entire contents of all of which are herein incorporated by reference.

FIELD OF THE INVENTION

This invention relates to business methods and systems, including such business methods and or systems implemented with the aid of computers.

BACKGROUND OF THE INVENTION

An annuity is a contract between an annuitant and an insurance company, in which the annuitant pays the insurer a specified amount of money and receives, in return, regular payments for a stated period of time, which period of time may be the life of the annuitant. The specified payment is made at the time that annuity contract is entered into, and the insurance company invests the money paid. At a future time, the annuitant receives the benefit of the money invested in a stream of payments which corresponds to the growth of the investment.

There are two basic types of annuities: fixed and variable. In fixed annuities, the annuity stream is a fixed amount in accordance with a payment schedule. In a variable annuity, premiums may be invested in a variety of financial instruments, ranging from individual stocks and mutual funds to real estate and certificates of deposit. Thus, the annuitant's return will fluctuate in a variable annuity, depending upon the market and the success of the portfolio.

Because of the hybrid nature of variable annuities, which often combine some insurance-like assumptions of risk by the insurer, with securities-like assumption of risk on the part of the contract owner, the United States Supreme Court ruled in SEC v. Variable Annuity Life Ins. Co., 359 U.S. 65 (1959), SEC v. United Benefit Life Insurance Co., 387 U.S. 202 (1967) that variable annuities are both insurance contracts and securities, subject to both state insurance regulation and federal securities regulation. A mutual fund is an open-ended fund operated by an investment company, which raises money from shareholders and invests in a group of assets, in accordance with a stated set of objectives. Benefits to the shareholder include diversification and professional money management. Shares are issued and redeemed on demand, based on the net asset value, which is determined at the end of each trading period or session. Mutual funds are federally regulated securities, with markets risk entirely assumed by the investor.

Hybrids of insurance contracts and mutual funds have been developed. They are sold in a two-step process in which the end consumer purchased a share of an underlying mutual fund (federal security) and simultaneously, but as a separate transaction, becomes a participant in a group insurance policy. The participation in the mutual fund by purchase of shares allows the investor to fully participate in the market movement of the underlying fund. The group insurance contract typically states that the policyholder will receive a benefit only if, at the time of death, the value of the mutual fund share is less than the original purchase price. The hybrid process is both cumbersome for the investor and expensive to administer for the distributor, as it requires the simultaneous sale of two contracts regulated by different agencies (federal securities and state insurance). This mandates an added level of expense for the issuer, a layer of regulation for the distributor and transactional complexity for the consumer.

SUMMARY OF THE INVENTION

A data processing method and system according to an aspect of the invention manages a financial services configuration, which includes a legal entity such as a trust, a contractual relationship or a corporate entity that provides for beneficial ownership so as to achieve the benefits of ownership in the underlying entity, whereby the entity invests funds, that inure to the benefit of the Beneficiary during the Beneficiary s lifetime and upon death to the Beneficiary s estate. A corporation may serve as one form of legal entity that fulfills the requirement set forth whereby it issues two series of stock comprised of voting rights and beneficial rights respectively. The second series provides each stock holder investment control over allocations of one or more of a plurality of funds within one or more separate accounts.

The data processing system for managing the financial services configuration comprising one or more financial sub accounts established by a legal entity issuing instruments evidencing ownership having a beneficial right in the legal entity wherein an owner of a beneficial right has investment control of allocations over one or more selected funds within one or more segregated financial accounts, said accounts managed by software operative to control a first means for initializing a storage means that partitions data concerning the legal entity, the investors and investment funds and a second means to retrieve investment funds information from the storage means into separate files regarding one or more investment funds and for calculating incremental increases or decreases in the value of the investment funds based upon market performance whereby the second means allocates the results of the calculation of increases and decreases in the value of the investment funds and a third means for calculating the incremental income, expenses, and net realized gain or loss for the one or more plurality of investment funds on an aggregate basis and for allocating the results on a percentage basis in respect of the investor's selected funds and for distributing and storing the increment or decrement in fund assets in the financial sub accounts.

The data processing system also retrieves fund information and calculates that information on an individual and aggregate basis and displays and prints for the current value of the investor's portfolio and provide the means to calculate the amount due in respect to a death benefit or a living benefit.

In one aspect of the invention the data processing system includes a graphical user interface, a display and a selection device, such that it allows for a .method of selecting from a menu on the display and thereafter retrieving a set of menu entries for the menu, each of the menu entries representing an investment fund characteristic pertinent to the investor; displaying the set of fund information and receiving a menu entry on the display; receiving a menu entry selection signal indicative of the device pointing at a selected menu entry from the set of menu entries; and in response to the signal, performing a search of a database for a match to the fund characteristic represented by the menu entry, and calculating an investor's current value of the investor's separate account within the segregated account and providing the investor a means to calculate the amount due in respect to a death benefit and a living benefit.

In general, the second series of stock creates beneficial rights in a financial product. Moreover, each holder of a beneficial right has investment control over allocations of a plurality of funds within one or more separate financial accounts. The separate accounts represent the financial component of one or more financial products that combine the benefits of a family of funds with the protection element that assure the beneficiaries either: (i) the highest of the account value at time of liquidation, (ii) original contract price plus subsequent deposits adjusted for redemptions, or (iii) the maximum contract value on a stipulated date during the period of time the instrument underlying ownership in the account is held by the investor. An advantage of the method and system according to this aspect of the invention allows the simple sale of the financial product, where it might otherwise be cumbersome depending on a patchwork of tax, securities and insurance laws.

The method for managing processing a financial service comprising the steps of: creating one or more sub accounts such as a segregated financial account by issuing instruments evidencing ownership having a beneficial right in a legal entity wherein an owner of a beneficial right exercises investment control of allocations over one or more selected funds within one or more segregated financial accounts, utilizing a computer system, including the steps of: initializing a storage means that partitions data concerning the legal entity, the investors and investment funds; retrieving investment funds information from the storage means into separate files regarding one or more investment funds; and calculating incremental increases or decreases in the value of the investment funds based upon market performance; allocating the results of the calculation of increases and decreases in the value of the investment funds; calculating the incremental income, expenses, and net realized gain or loss for the one or more plurality of investment funds on an aggregate basis; and allocating the results on a percentage basis in respect of the investor's selected funds; and distributing and storing the increment or decrement in fund assets in a segregated financial account.

DESCRIPTION OF THE INVENTION

Figure 1A:
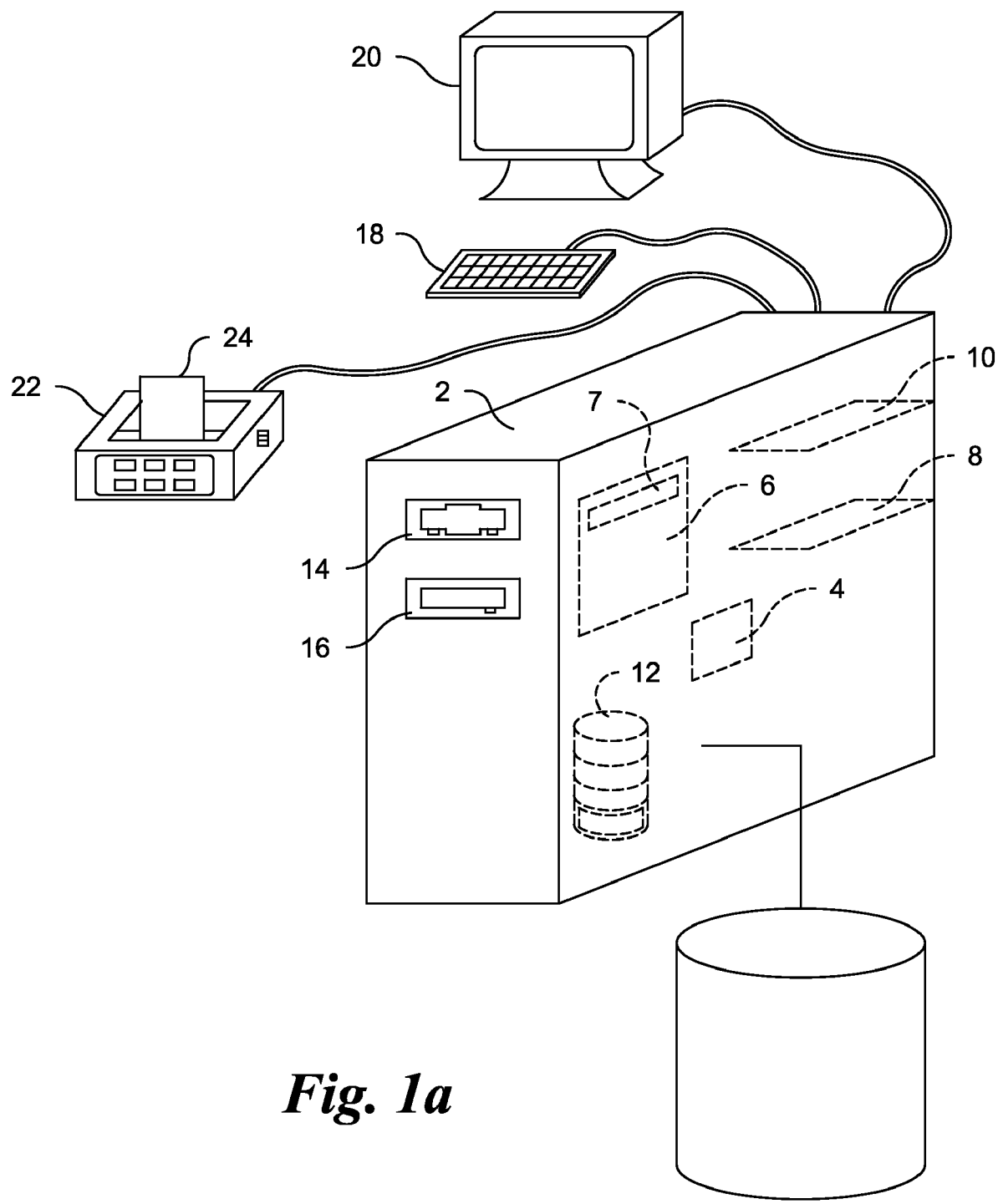
FIG. 1a illustrates a conventional data processing system suited to perform the financial management function.

In the figures to be discussed the circuits and associated blocks and arrows represent functions of the process according to the present invention which may be implemented as computers, electrical circuits and associated wires or data busses, which transport electrical signals. Alternatively, one or more associated arrows may represent communication (e.g., data flow) between software routines, particularly when the present method or apparatus of the present invention is implemented as a digital process.

The following definitions are used herein.

Account: The account set up for each Account Owner or Joint Account Owner under a Segregated Account.

Account Charges: Charges that are deductible from an Account, comprising the Maintenance Fee, Administrative Charge, and Contingent Deferred Sales Charge.

Account Owner: An owner of a beneficial right in a Segregated Account Company, also referred to as an investor, who is determined eligible to purchase the instruments evidencing ownership in the Segregated Account Company.

Account Value: The value of an Account Owner's Preferred Shares is the sum of the financial units allocated to the Sub-Account corresponding to an underlying fund multiplied by the unit value for that Sub-Account, less account charges.

Administrative Charge: The annual administrative charge applied pro-rata on a scheduled basis to each Account.

Anniversary Value: For each anniversary of the issue date, the value calculated by adjusting the Account Value, by increasing it by the dollar amount of any purchase payments made subsequent to each anniversary of the issue date, and reducing it proportionally by any redemptions subsequent to each anniversary of the issue date. The proportion is based on the amount of any redemption divided by the Account Value at the time of the redemption.

Beneficiary: The person named by the Account Owner to receive a redemption upon the death of the Account Owner.

Common Stock Shareholder(s): Shareholders of the Segregated Account Company's common stock.

Contingent Deferred Sales Charge: The deferred sales charge that may apply when the account owner makes a redemption.

Evidence of Ownership: Direct or indirect financial benefits of ownership of an underlying investment which may be expressed in instruments such as preferred shares, common Shares, trust receipts, structured notes, debentures, bond, certificate of deposits, investment contracts, performance contracts of funding agreements where an investor has invested funds in order to receive the financial benefit of performance of the underlying assets.

General Account: The account holding all of the Segregated Account Company's assets, except for those assets held in Segregated Accounts.

Initial Purchase: The amount of money paid to the Segregated Account Company to purchase the Preferred Shares.

Intermediary: The distributors with whom the Segregated Account Company has entered into an agreement to sell the Preferred Shares to the Account Owner.

Issue Date: The date on which Preferred Shares are issued.

Legal Entity: Any corporation issuing stocks, notes, bonds, debentures, investment contracts, investment receipts or other evidence of direct or beneficial ownership in underlying securities or mutual funds, or any trust companies, holding companies, mutual ownership companies (both open and closed end) issuing any Evidence of Ownership.

Living Benefit: Where the investor, in return for an additional charge, may elect to receive the greater of the original account value, a stated investment return over a defined period of time or a current account value derived from a pre-determined selection of mutual funds.

Maximum Anniversary Value: The highest Anniversary Value prior to the Account death or upon reaching a designated age or elapsed period of time.

Net Asset Value (NAV): The per share net asset value of each underlying fund. Each underlying fund determines its own NAV.

Net Investment Factor: The Net Investment Factor for each Sub-Account equals: The NAV plus applicable distributions per share of each underlying fund held in the Segregated Account at the end of the current valuation day divided by the Net Asset Value per share of each underlying fund held in the Segregated Account at the end of the prior valuation day, multiplied by the Administrative Charge expressed as a formula.

Peak Redemption: The amount payable on the death of the Account Owner or amount due upon reaching a designated age or elapsed period of time.

Peak Redemption Value: The Peak Redemption Value for an Account is equal to the greatest of (i) the Account Value, (ii) the total Purchase Payments reduced proportionately by total redemptions, or (iii) the Maximum Anniversary Value. The implementation of the invention may also substitute by way of example other forms of protection benefit amounts designed to close a shortfall in assets and liabilities.

Preferred Shares: The Preferred Shares which correspond to the beneficial ownership in one or more Segregated Accounts. The implementation of the invention may also substitute by way of example forms of financial instruments such as those evidenced by other types of corporate shares or by structured notes, debentures, bonds, trusts, certificates of deposit, contracts, or agreements.

Segregated Account: An account established by the Segregated Account Company, which holds the assets invested by investors. The implementation of the invention may also substitute by way of example forms of account structure such as separate accounts, trustee accounts, partitioned accounts, continuous cells, pledged accounts, or hypothecated accounts.

Segregated Account Company: A company, which holds the assets invested by Account Owners which is generally not subject to the liabilities arising out of any other business of the company unrelated to that account and not affected by the investment performance of the company's general account and credited with income and gains, and losses, whether or not realized, from the assets it holds. The implementation of the invention may also substitute by way of example trust companies, limited partnerships, general partnerships, special purpose companies, and charitable remainder trusts.

Sub-Account: The account comprising Segregated Accounts, Separate Accounts, Partitioned Accounts, Master Trust, Protected Trusts, Custodial Accounts and Special Purpose funding vehicles established under the Segregated Account of the Segregated Account Company to hold the units, which corresponds to a particular underlying investment fund.

The invention herein is in response to both distributor and investor interest in a single product that combines the benefits of a family of funds, such as mutual funds, with certain investment protection elements. The invention provides a Living Benefit which allows a Beneficiary the option of receiving the greater of the original account value, a stated floor value of the investment return over a stated period of the current account value at the time of redemption as such value may be derived from a pre-selected group of investments. The protection element also can assure the Beneficiary of the Peak Redemption Value at the time of death. The product uses a Legal Entity such as a trust, which issues trust certificates, or a company, which issues preferred shares, each instrument and underlying rights and benefits, having legal protection against general creditors of the Legal Entity. The beneficial interests are coupled to a Peak Redemption Value feature that provides ease-of sale for the Intermediary, also referred to as a distributor, and a straightforward low cost form of corporate governance when compared to a standard mutual fund company, an insurance company, or a hybrid company selling mutual funds and insurance contracts.

According to an aspect of the invention, a corporation, referred to as a Segregated Account Company, having Segregated Accounts issues ordinary or common shares and preferred shares. However, in one embodiment, all Preferred Shares, regardless of class, convey the same rights, including rights as to redemptions. Other classes of shares may be issued with other benefits or restrictions.

The monies received by the Segregated Account Company from the purchase of the Preferred Shares, net of sales charges, if any, are deposited in a Segregated Account of the Segregated Account Company and are allocated to an account established in the name of the Account Owner. Thereafter, the assets allocated to the Account Owner are invested through the Segregated Account in units of Sub-Accounts of the Segregated Account, each of which corresponds to an underlying investment fund, as by way of example a mutual fund. The Segregated Account assets in accordance with the instructions of the Account Owners will be invested in each Sub-Account corresponding to the underlying fund in accordance with the selected investment control allocations of the Account Owner. The net income and net profits attributable to the units within the fund is generally reflected in the respective NAV of the funds.

The Segregated Account Company will effectuate transactions in shares of the underlying funds on a pooled basis through the Segregated Account for all Account Owners in order to facilitate administrative efficiencies and reduce costs. For example, mutual fund shares purchased on behalf of a Sub-Account investing in such underlying funds will be held in the Segregated Account. All rights and interests in the underlying funds will be vested in the Segregated Account on behalf of the Account Owners. The Account will receive units of a particular Sub-Account, which will reflect a bookkeeping entry indicating the value of the Account Owner's stake in the corporation. Assets held in the Segregated Account will not be subject to claims of creditors of the Segregated Account Company with claims unrelated to the Segregated Account.

The system that carries out an aspect of the invention utilizes a data processing system for managing the Legal Entity, the investments and the specialized financial transactions required in the issuance of Preferred Shares, and establishment of the Segregated Accounts. Those skilled in the art of computer programming will appreciate that the invention may be implemented in a system of computer units distributed over a wide area network and include personal computers as well as server computers to carry out the intent of the invention described herein. In FIG. 1a, a computer processor such as a personal computer or a server computer 2 comprises at least one computer that includes a CPU 6; memory 4 and one or more file storage medium 12 internal or external to computer for storing data, arithmetic logic units 7 for making mathematical calculations, a disk storage medium, disk drive 16, and disk drive 14 to aid in the storage of and to store selected data. Additional means 10 and means 8 are interfaces between the computer 2 and external accessories such as a display monitor 20, keyboard 18, and a printer 22. Additional means 8 also represent interfaces between the computer 2 and external accessories such as access to a local area networks or other networks of computers (neither illustrated), if required or desired. The CPU 6 both controls and is controlled, by other hardware and software stored in memory 4 and on a portion of storage medium 12.

The data processing system utilizes a computer readable medium having computer-executable instructions for initializing a storage means that partitions data concerning a Legal Entity, one or more investors and investment funds; retrieving the investment information from the storage means into separate files regarding one or more investment funds; and calculating incremental increases or decreases in the value of the investment funds based upon market performance; allocating the results of the calculation of increases and decreases in the value of the investment funds; calculating the incremental income, expenses, and net realized gain or loss for the one or more plurality of investment funds on an aggregate basis; and allocating the results on a percentage basis in respect of the investor's selected funds; and distributing and storing the increment or decrement in fund assets in a financial sub account.

Figure 1B:
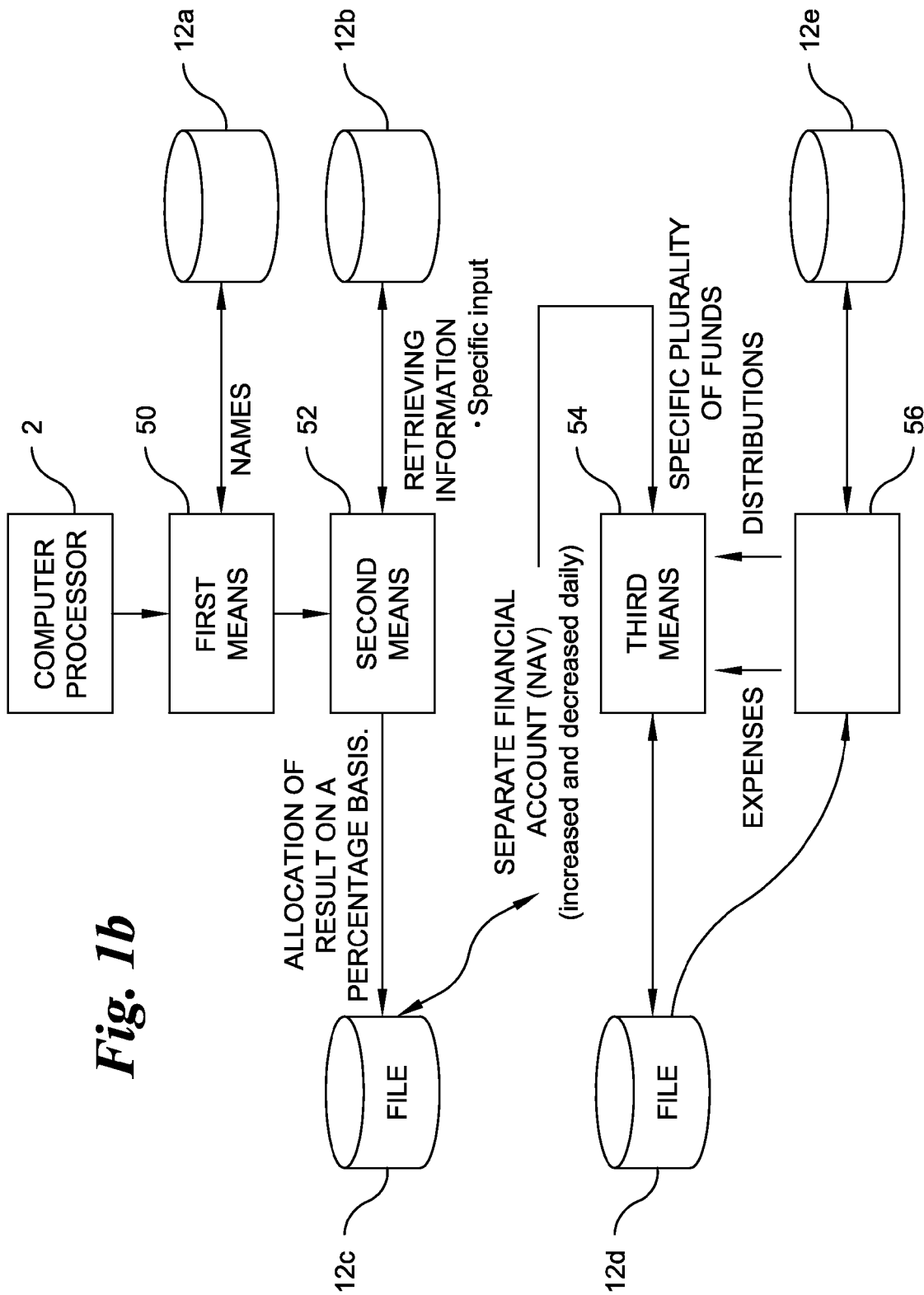
FIG. 1b illustrates a data processing system that embodies one aspect of the present invention.

In referring to fig. 1a in conjunction with FIG. 1b, the software resident in memory 4 and storage medium 12 includes first means 50 for initializing the storage means 12a associated with storage medium 12 into separate files that partition data into records concerning the Legal Entity, the investors and all pertinent information regarding by way of representative examples: names, addresses, ages, social security numbers, bank references, insurance related information, medical information, amounts invested and Account Owners.

Figure 1C:
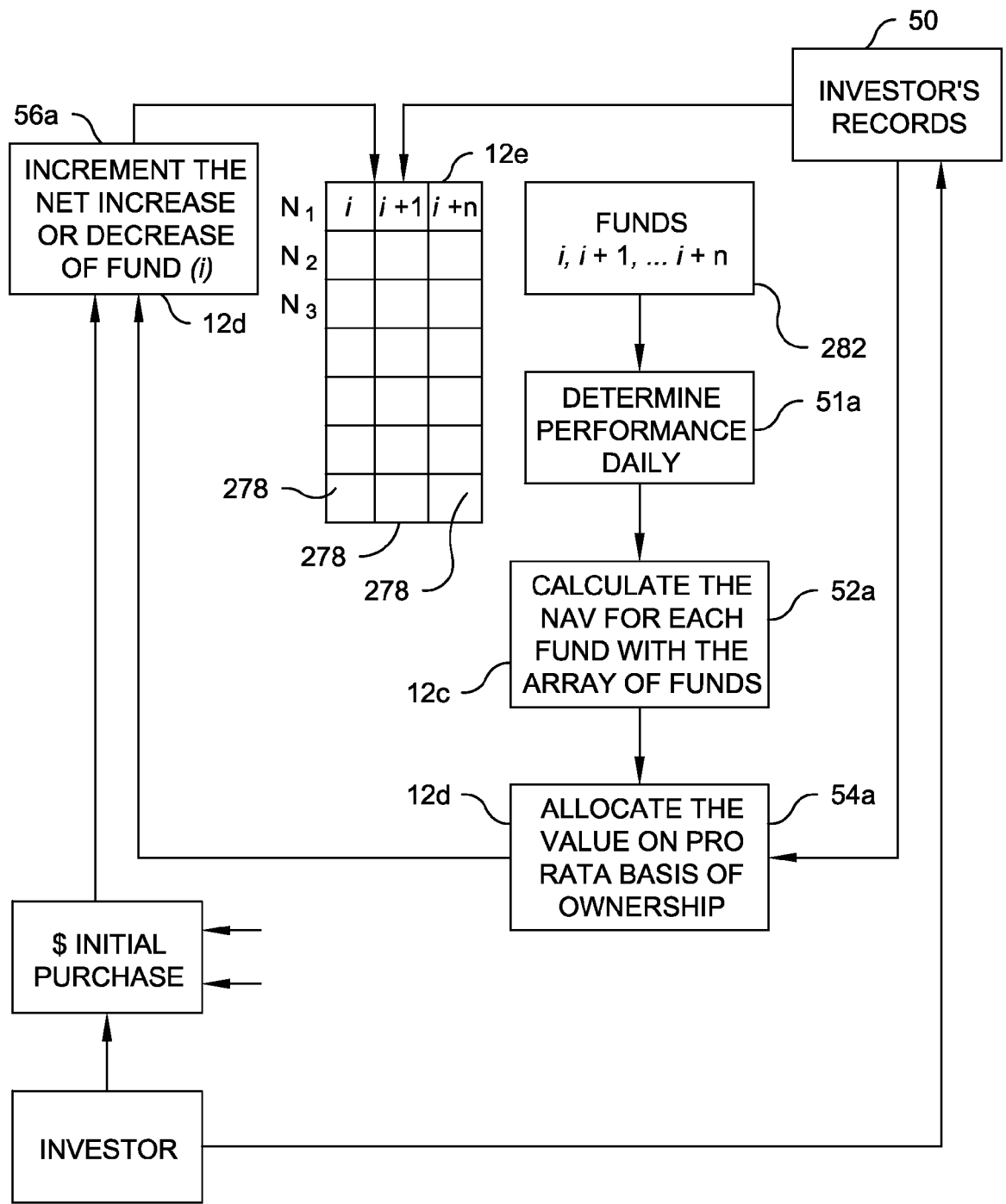
FIG. 1c illustrates a Flow chart of an exemplary process of one aspect of the present invention.
Figure 2A:
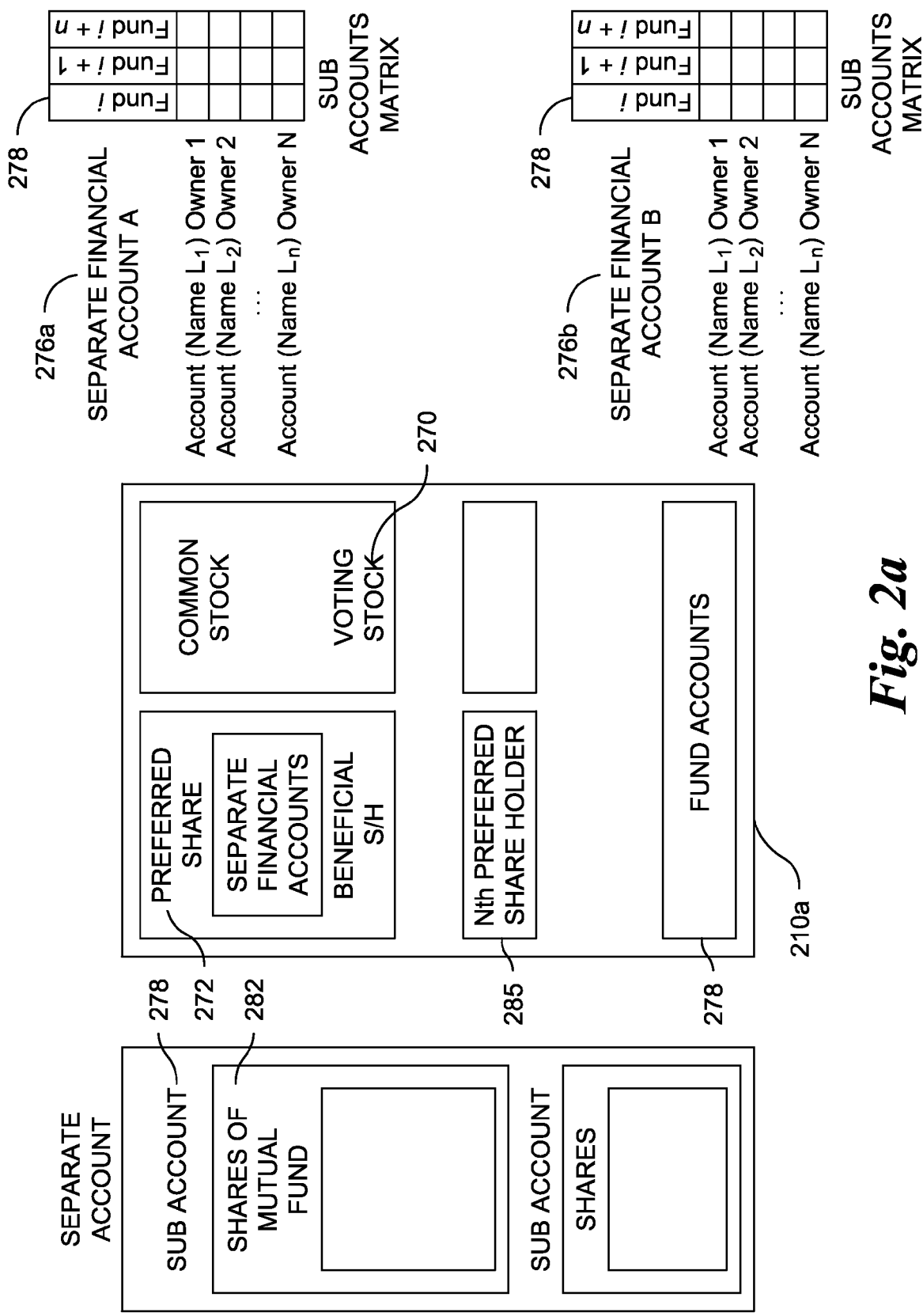
FIG. 2a illustrates a segregated account company and associated accounts.

In referring to FIG. 1b, FIG. 1c and FIG. 2a a second means 52 comprises the arithmetic logic circuit configured to retrieve information from storage means 12b associated with storage medium 12 into separate files that partition data, calculate incremental increases or decreases in the value of the funds 278 based upon input from external accessories such as local area network computers or other networks of computers, whereby the second means 52 allocates the results of the calculation of 282 increases and decreases in the value of the funds 282 on a percentage basis in respect of the performance of the funds 282, and stores the output in a separate file 12c for processing data regarding assets in each of the funds 282. A third means 54 comprising an arithmetic logic circuit is configured to retrieve information from file 12c, calculate the incremental income, expenses, and net realized gain or loss for the one or more plurality of Sub-accounts 278 funds and allocate the results on a percentage basis in respect of the investors 285 and store the output in a separate file 12d and a fourth means 56 comprising an arithmetic logic circuit configured to retrieve information from file 12d and to distribute the Sub-Account increment or decrement 278 fund assets and store the output in a separate file 12e as a Segregated Account. File 12f represents one or more files that serve as intermediate storage for the various transactions that the require additional data such as NAV.

The software resident in memory 4 and storage medium 12 reads and writes computer readable medium having stored thereon a data structure comprising a first data field representing the Legal Entity, a second data field representing the investors a third data field representing investment funds and fourth data field representing separate files regarding the investment funds, a fifth data field representing the calculation of increases and decreases in the value of the investment funds sixth data field representing the incremental income, seventh data field representing expenses, an eighth data field representing and net realized gain or loss for the investment funds on an aggregate basis; a ninth data field representing the allocation of the net realized gain or loss for the investment funds on a percentage basis in respect of the investor's selected funds and a ninth data field representing the increment or decrement in fund assets in the financial sub accounts.

Figure 2B:
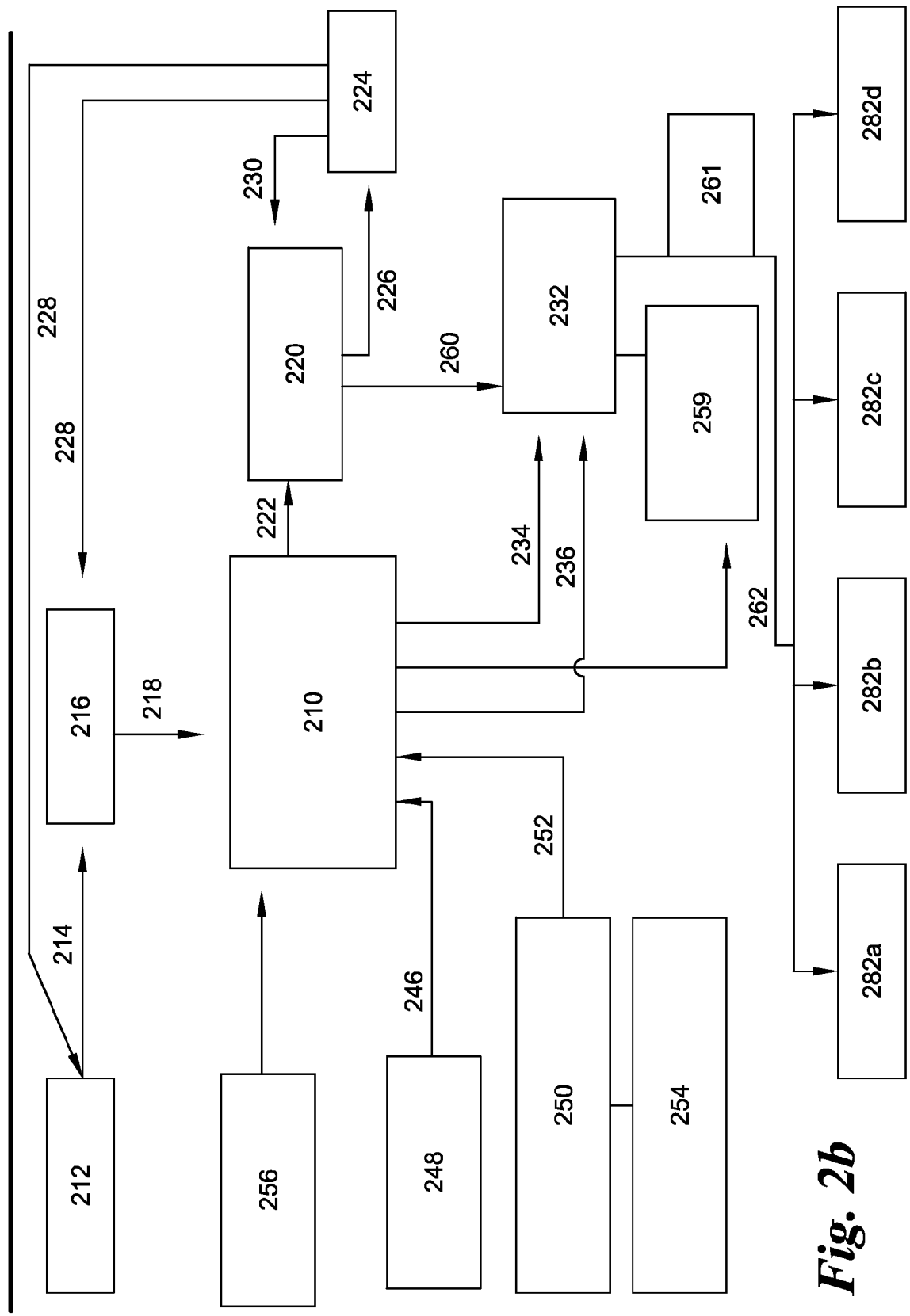
FIG. 2b illustrates an exemplary corporate structure showing the connection among the segregated account company and its infrastructure.

Referring to FIG. 2a and FIG. 2b, a corporation 210 having a treasury and various accounts 210a issues stock comprised of a first series, typically common stock 270 having voting rights and a second series, without voting rights, typically referred to as Preferred Shares, 272 but having beneficial rights in the corporation 210. Each holder of a beneficial right as may be evidenced by the Preferred Shares 272, has investment control over allocations of one or more Sub-Accounts 278 funds as represented in fund accounts 278 of the corporation, referred to as one or more Segregated Accounts such as separate accounts 276a and 276b. The value of the Preferred Shares 272 is based on the value of underlying Sub-Accounts 278 invested in underlying mutual funds 280. The sub-accounts 278 are held through the corporation 210 segregated accounts, which are not available to satisfy the general obligations of the Legal Entity.

An aspect of the invention also includes the corresponding method of managing a financial services configuration, which includes the Legal Entity such as a trust, a contractual relationship or a corporate entity that provides Evidence of Ownership so as to achieve the benefits in the underlying Legal Entity, whereby the Legal Entity invests funds, that inure to the benefit of the Beneficiary during the Beneficiary's lifetime and upon death to the Beneficiary s estate. Such a Legal Entity as a corporation serves as one form of the invention that fulfills the requirement set forth herein.

A financial services configuration of one or more separate financial accounts established as a corporation issuing stock whereby the method includes issuing shares of common stock having voting rights and issuing a second series of shares having beneficial rights in the corporation, each holder of evidence of ownership exercising investment control over allocations of one or more funds within one or more separate accounts, and processing data pertaining to the separate accounts.

Referring to FIG. 1b and FIG. 1c, an aspect of the invention further includes the method of storing fund data 282 on a storage medium 126; retrieving fund data 282 from a file on storage medium 126, calculating 51a incremental increases or decreases based on daily fund performance data and calculating 52a NAV for each fund, allocating 54a the results on a percentage basis in accordance with the investment control over allocations, and storing 56a the output in a separate file 12e for processing data regarding assets 278 in the one or more separate financial accounts 276 and for allocating the percentage share that each holder of a evidence of ownership holds in the one or more funds.

The data processing system also retrieves fund information and calculates that information on an individual and aggregate basis to display to the investor their current value of their portfolio and provide the means to calculate the amount due in respect to a death benefit or a living benefit FIG. 2b illustrates an exemplary corporate structure according to an aspect of the invention, showing transactional connection among the Segregated Account Company 210, the Intermediary 216 and other participating parties such as fund managers. Intermediary 216 contracts with Segregated Account Company 210 to sell Preferred Shares, and also transacts with an investor 212, as indicated by connection 214, to purchase Preferred Shares issued by the Segregated Account Company 210.

A connection line 218 represents the interactions between the Intermediary 216 and the Segregated Account Company 210. A management company 220 performs services for the Segregated Account Company 210. A line 222 connecting the Segregated Account Company 210 with the management company 220 represents the transmittal of information to the management company 220 relating to the purchase of Preferred Shares. The management company 220 examines the application to purchase Preferred Shares to application is in good order, and contains all the information needed for processing.

The subsidiary transfer agent 224 receives the approved application for the purchase of Preferred Shares in the Segregated Account Company 210, and issues the Preferred Shares on behalf of the Segregated Account Company 210. The subsidiary transfer agent 224 also generates confirmations of the purchase, which are sent to the Intermediary 216, as suggested by connection line 228, and to the investor 212. In addition to the issuance of Preferred Shares, the management company 220 also makes "book entries covering the transaction, sets the NAV, and instructs the custodian bank 233 to wire transfer funds 260 as required. In addition, the management company 220 also sends duplicate instructions to the Segregated Account Company 210 by way of a management company 220, as suggested by connection lines 230 and 222.

The funds paid to purchase Preferred Shares by the investor in the Segregated Account Company 210 through the Intermediary 216 are deposited with a custodian bank 233. The transfer of the funds as represented by a connection line 234, which may be for example, a wire transfer. In addition, the Segregated Account Company 210 instructs a custodian bank 233, as suggested by connection line 236, of aggregated mutual fund allocations selected by the investor 212 who hereafter may alternatively be referred to as an Account Owner, making an initial Preferred Share purchase on that day, together with changes in allocation made on that day by current owners of Preferred Shares. Custodian bank 233 purchases and sells mutual fund shares from among the mutual funds illustrated as blocks designated 282a, 282b, 282c and 282d, so that the aggregate purchases and sales make the allocations among the mutual funds correspond with the selections of the collective investors, which is to say all those persons who are or have been in the place of investor 212.

According to an aspect of the invention, death of an investor 212 results in the availability to the beneficiaries of the Account Owner 212 account at a value referred to as the Peak Redemption Value. In order to provide liquidity for investors, an agreement, illustrated as a line 246, is entered into between the Segregated Account Company 210 and a capital maintenance company 248. Under certain economic conditions, the Peak Redemptions value may exceed the current account values. The risk of being required to pay more than the current account value to the beneficiaries of the Account Owner may optionally be transferred from the Segregated Account Company 210 to an insurer 250, as suggested by connection line 252. The insurer 250 may in turn transfer all or a portion of the risk to one or more reinsurers 254.

Figure 2C:
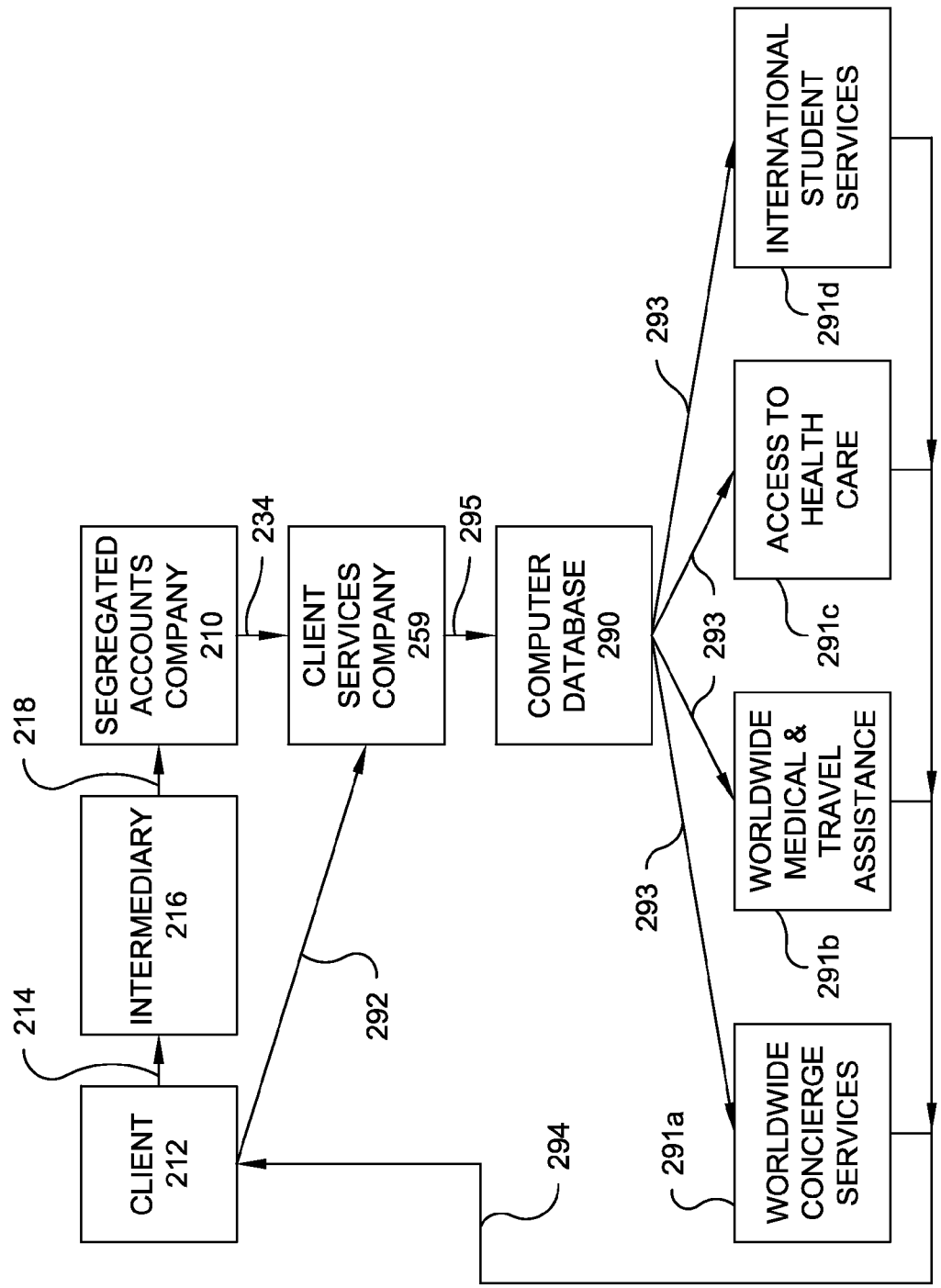
FIG. 2c illustrates an exemplary structure showing access and fulfillment of ancillary services.

A client service 259 provides the Account Owner 212 with access and fulfillment of numerous services as by way of example, travel services, credit lines, and access to health care. Referring to FIG. 2c, an investor 212 invests in Segregated Accounts Company 210 through Intermediary 216. Segregated Accounts Company 210 provides database of customers to client services company 259, as suggested in line 234. Client 212 contacts client services company 259 via by way of example, telephone or email, when Client 212 wishes to use a service. Client Services Company 259 accesses 295 a computer database 290 to match Client 212 with an appropriate service illustrated as blocks 291a, 291b, 291c and 291d as suggested in line 293. Appropriate client service are provided to client 212, as suggested in line 294.

As previously indicated, the Segregated Accounts Company 210 may be a Legal Entity structured as a stock company having as a corporate purpose the issuance of preferred shares. The underlying funds received from the sale of the Preferred Shares are self-directed by the Account Owner to one or more mutual funds.

The method for managing processing a financial service includes the steps of: depositing by an investor with an intermediary, funds for the purchase of a segregated account company shares and corresponding instructions to purchase one or more funds with the proceeds of funds for the purchase; transmitting the instructions to a trading agent to purchase the one or more funds and crediting the one or more funds to the segregated account company account, whereby the segregated account company pays for the purchase of the one or more funds.

Figure 3:
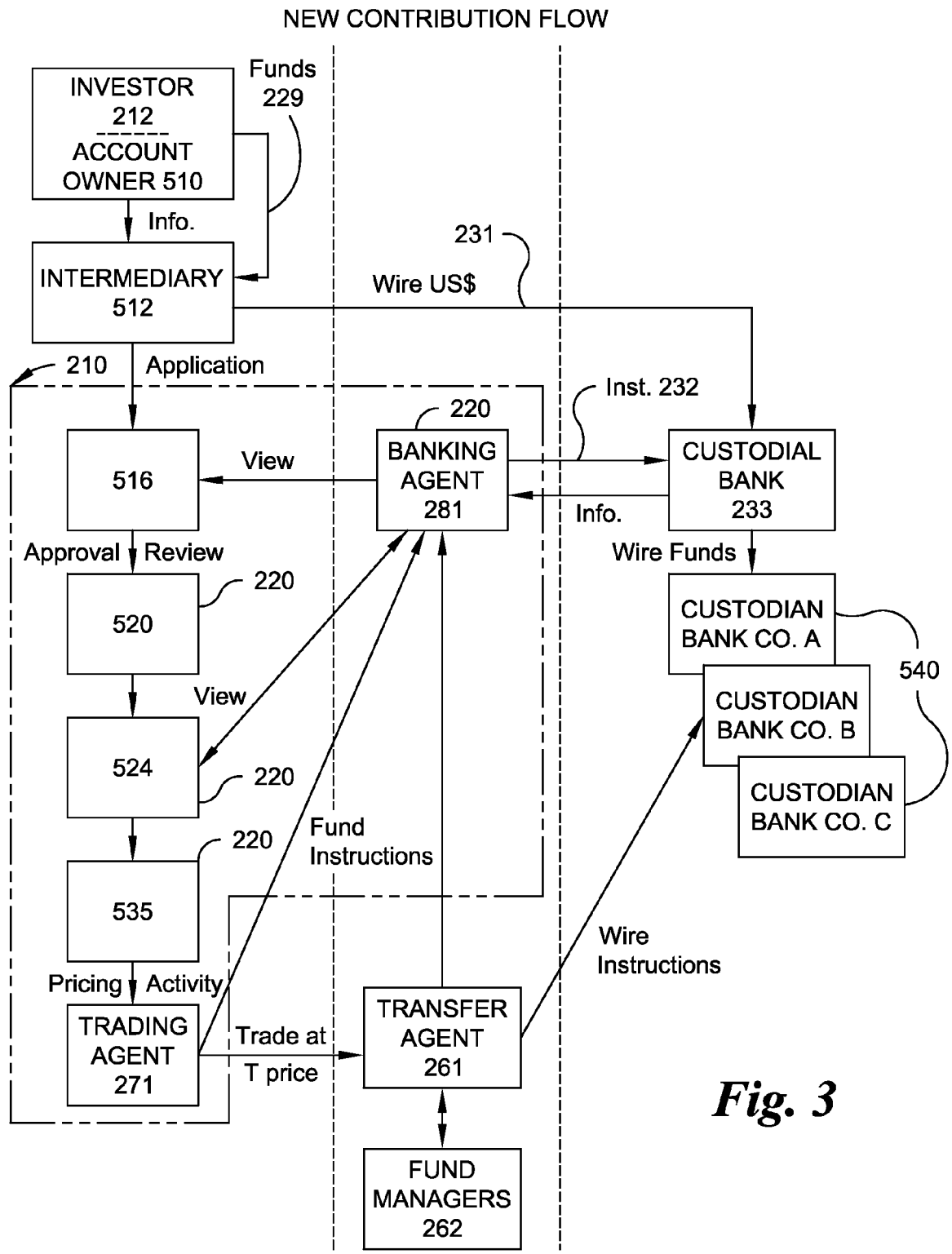
FIG. 3 illustrates a flow chart of new investment contribution flow for processing an investment in accordance with an aspect of the invention.

As illustrated in FIG. 3, the foregoing method is initiated by an investor 212 who desires to become an Account Owner 510. On the first trading day of a financial transaction the investor 212 deposits funds with Intermediary 512. Intermediary 512 submits an application for the purchase of Preferred Shares on behalf of the investor 212 in the Segregated Account Company 210 typically having the functions indicated by the blocks within the enclosed dotted line. The Segregated Account Company 210 in association with the management company 220 determines 516 the prospective Account Owner's 510 eligibility 520 to purchase Preferred Shares. If the investor 212 is eligible for the purchase of Preferred Shares, the application is accepted and instructions to purchase assorted mutual funds in accordance with investor 212, now referred to as the Account Owner 510 instructions, are transmitted 53 through the Segregated Account Company 210 trading agent 271 to transfer agent 261. On the second trade day transfer agent 261 then proceeds to purchase mutual funds through fund managers 262. At this time, the Account Owner 510 is vested in the Preferred Shares of the Segregated Account Company 210.

On a given trade date, the Intermediary 512 transfers 231 the Account Owner 510 funds 229 to the custodian bank 233 to cover the purchase order submitted by trading agent 271 on a given trade date.

On a given trade date, the Segregated Account Company 210 trading agent 271 communicates to Segregated Accounts Company 210 banking agent 281, a functionary typically provided by management company 220, instructing 232 custodial bank 233 to wire funds to mutual funds' custodial banks 540 on the given trade date.

Figure 4:
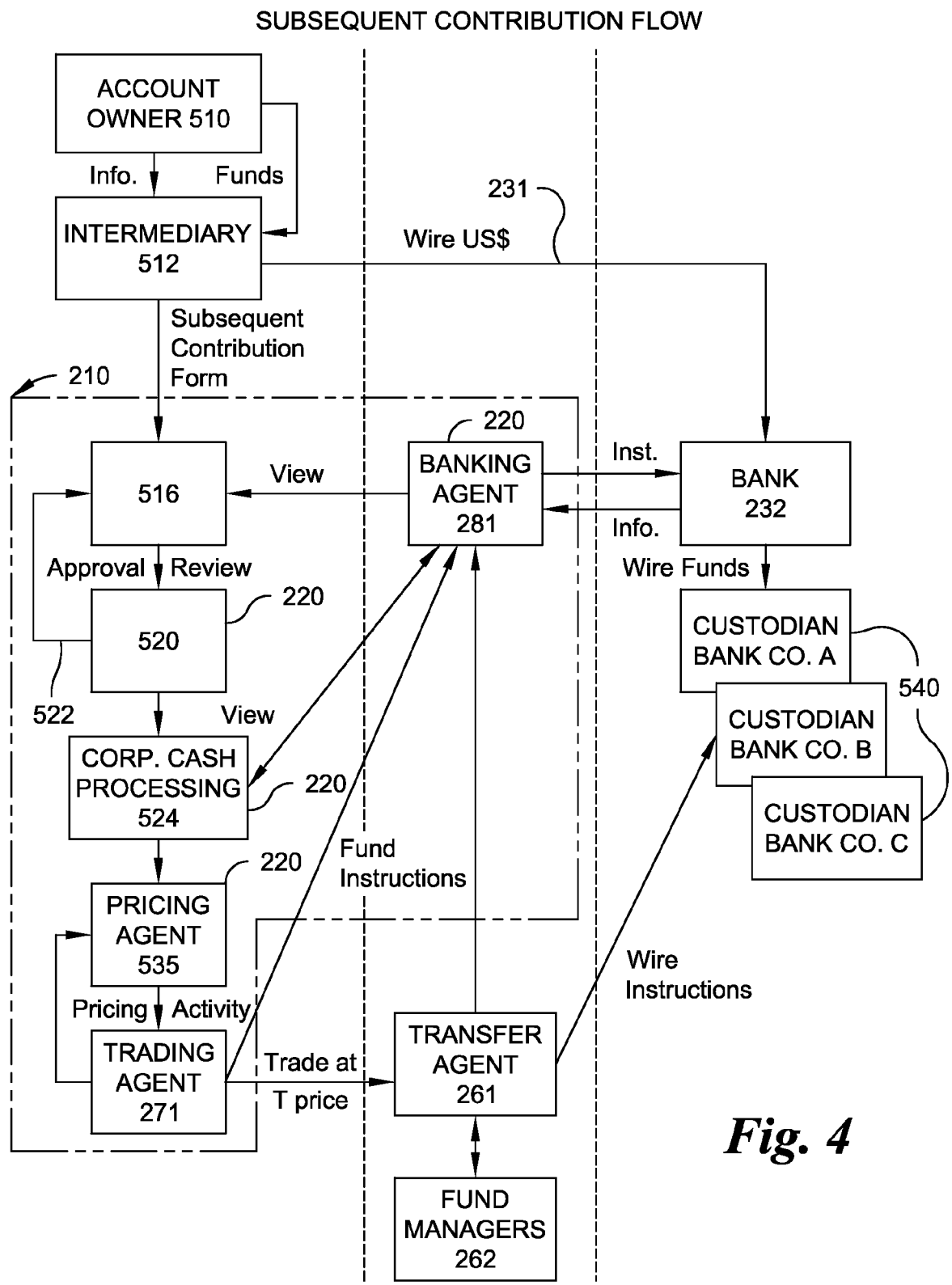
FIG. 4 illustrates a flow chart of an exemplary process for subsequent contribution flow process in accordance with an aspect of the invention.

FIG. 4 illustrates the transaction flow for subsequent contributions. The Account Owner 510, whose funds are on deposit with Intermediary 512, initiates the subsequent contribution. Intermediary 512 submits a subsequent contribution on behalf of Account Owner 510. The Segregated Account Company 210 in association with the management company 220 determines 516 the prospective Account 510 eligibility 520 to purchase Preferred Shares. If the Account Owner 510 is eligible for the subsequent purchase of Preferred Shares, the form is accepted and instructions to purchase assorted mutual funds in accordance with Account Owner 510 instructions, are transmitted through a Segregated Account Company 210 trading agent to transfer agent 261. Transfer agent 261 then proceeds to purchase mutual funds through fund managers 262. At this time, the Account Owner 510 is vested in the Preferred Shares of the Segregated Account Company 210.

On a given date, the Intermediary 512 transfers 231 the Account Owner's 510 funds to the custodian bank 233 to cover the purchase order submitted by trading agent 271 on the given trade date.

On the given date, the Segregated Account Company 210 trading agent 271 communicates to Segregated Accounts Company 210 banking agent 281 to instruct 232 Custodial Bank 233 to wire funds to mutual custodial banks 540 on a given trade date.

Figure 5:
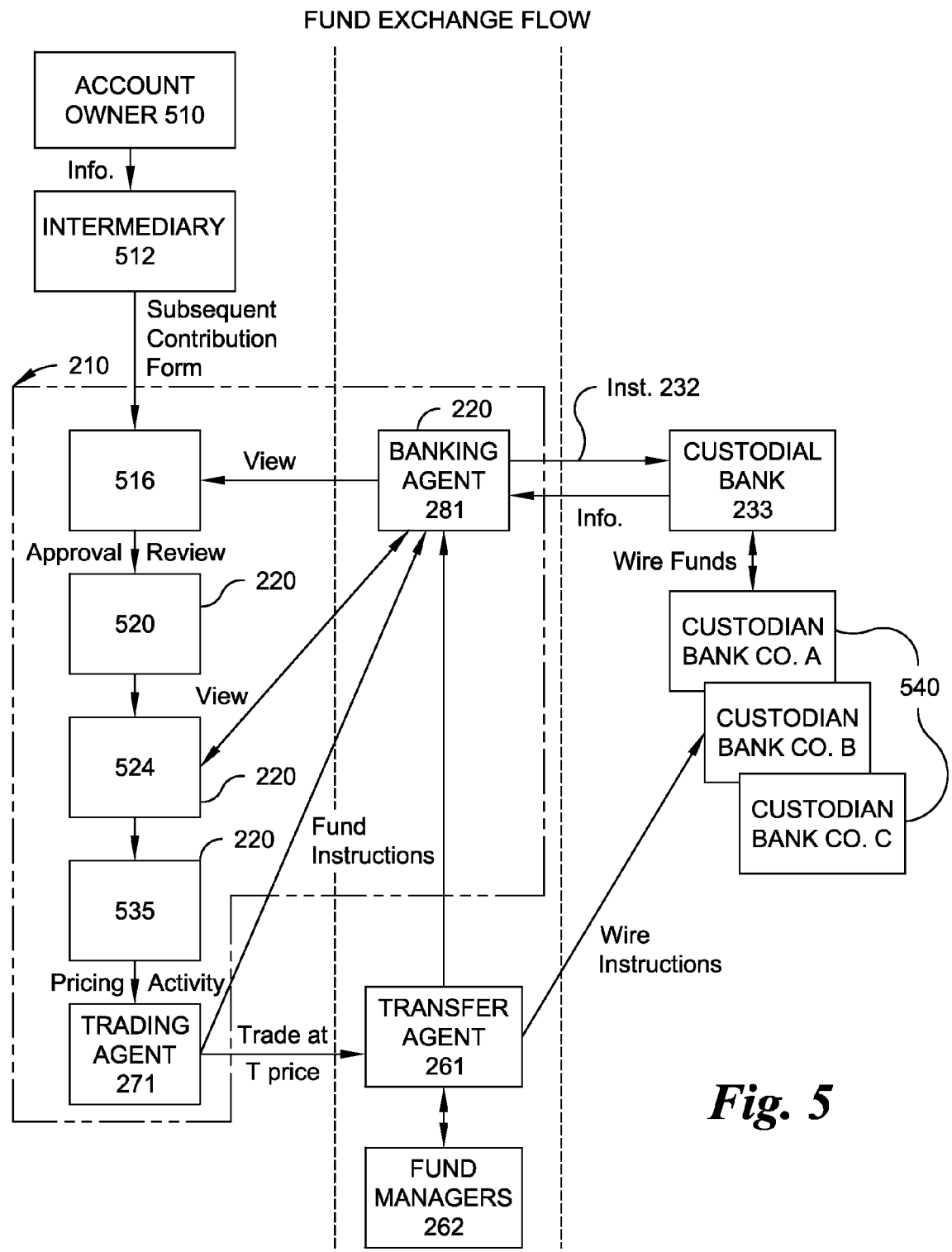
FIG. 5 illustrates a flow chart of an exemplary process fund exchange in accordance with an aspect of the invention.

FIG. 5 illustrates the transaction flow for fund exchanges. The Account Owner 510, initiates the fund exchange through the Intermediary 512 who submits a funds exchange request on behalf of Account Owner 510. The Segregated Account Company 210 in association with the management company 220 determines 516 the prospective Account Owner 510 eligibility 520 to exchange funds. If the Account Owner 510 is eligible for the fund exchange, the form is accepted and instructions to exchange assorted mutual funds in accordance with Account Owner 510 instructions, are transmitted through a Segregated Account Company 210 trading agent to transfer agent 261. Transfer agent 261 then proceeds to purchase and sell mutual funds through fund managers 262. At this time, the Account Owner 510 remains vested in the Preferred Shares of the Segregated Account Company 210.

On given date, the Segregated Account Company 210 trading agent 271 communicates to Segregated Accounts Company 210 banking agent 281 to instruct 232 the custodial bank 233 to receive funds from mutual funds' custodial banks 540 and to wire funds to mutual funds' custodial banks 540 on a given date.

On a given date, transfer agents 261 send wire instructions to mutual funds' custodial banks 540. On a given date, and certain "losing" mutual fund's custodial banks 540 wire funds to custodial bank 233. Custodial bank 233 wires 232 funds to "target" mutual fund's custodian bank 262.

The method as recited above, further includes the liquidation or redemption of funds which includes the steps of: submitting by an account owner through the intermediary a request for the redemption of shares in the Segregated Account Company; whereby the Segregated Account Company determines the eligibility to redeem the shares and if the account owner is eligible for the redemption then the Segregated Account Company proceeds to take steps, such as communicating to an agent to proceed to redeem the one or more funds by liquidating the one or more invested funds, for example the a group of mutual funds, in accordance with account owner instructions. Typically, a trading agent communicating to a funds transfer means, such as a custodian bank, will transfer sale proceeds to the intermediary and whereby the intermediary will transfer the liquidated funds to the Account Owner.

Figure 6:
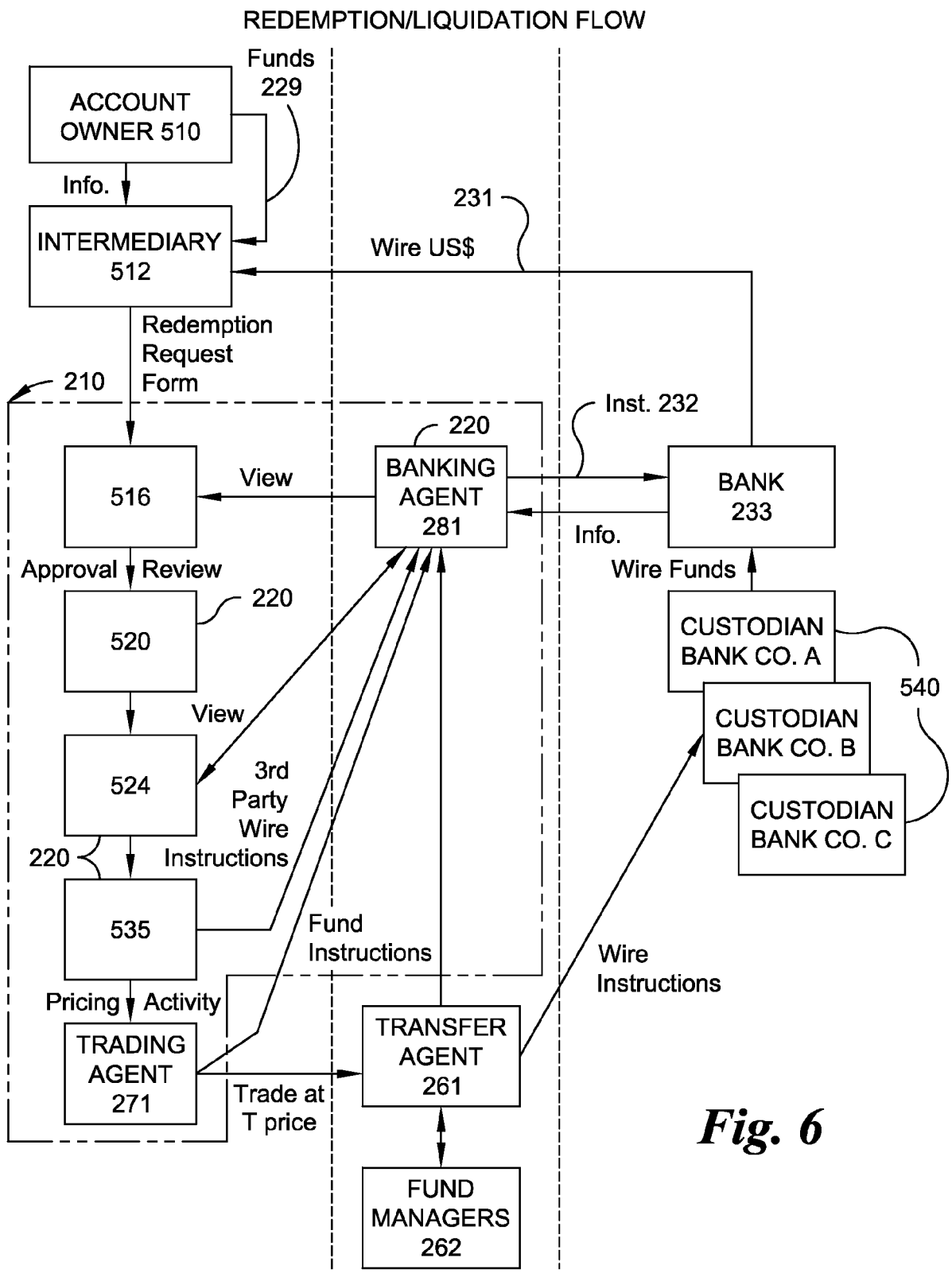
FIG. 6 illustrates a flow chart of an exemplary redemption or liquidation process, over three periods, in accordance with an aspect of the invention.

The transaction flow for redemption or liquidation of funds shown in FIG. 6 as initiated by the Account Owner 510. The Intermediary 512 submits a request for the redemption or liquidation of Preferred Shares in the Segregated Account Company 210 on behalf of Account Owner. The Segregated Account Company 210 in association with the management company 220 determines the prospective Account Owner 510 eligibility to redeem or liquidate Preferred Shares. If the Account Owner 510 is eligible for the redemption or liquidation of Preferred Shares, the request is accepted and instructions to redeem or liquidate assorted mutual funds in accordance with Account Owner 510 instructions, are transmitted through a Segregated Account Company 210 to transfer agent 261. Transfer agent 261 then proceeds to redeem or liquidate the mutual funds through fund managers 262. At this time, the Account Owner 510 is no longer vested in the Preferred Shares of the Segregated Account Company 210.

On a given date, the Segregated Account Company 210 trading agent 271 communicates to Segregated Accounts Company 210 banking agent 281 to instruct custodial bank 233 to wire funds received by mutual custodian banks 540 to Intermediary 512 on a given date.

On a given date 510 the custodian bank 233 transfers the Account funds to the Intermediary 512 to cover the redemption order submitted by trading agent 271 on a given date.

The method as recited also may include a death claim with a stepped up benefit, such that a Beneficiary of an owner of a beneficial right or Account Owner may continue with the deceased Account interest. The Segregated Account Company determines a prospective account owner eligibility to continue the account at a stepped-up valuation and if eligible then instructs the purchase of one or more funds in an amount of the stepped-up valuation, and communicates the instructions to a trading agent to purchase the one or more funds in accordance with the new account owner's instructions and crediting the one or more funds to the segregated account company account, whereby the segregated account company pays for the purchase of the one or more funds.

Figure 7:
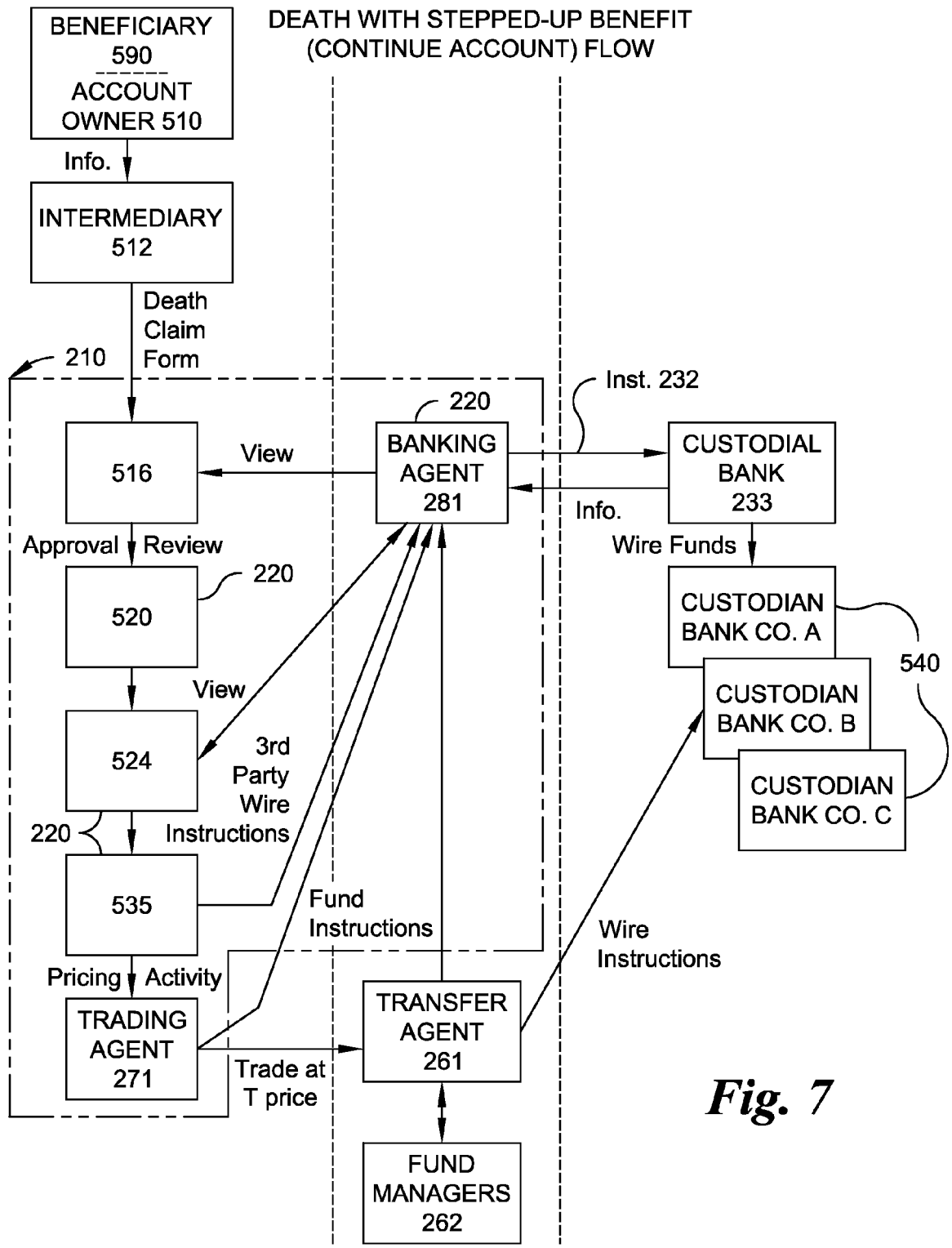
FIG. 7 illustrates a flow chart of an exemplary stepped-up death benefit process in accordance with an aspect of the invention, for the case in which the account continues.

The transaction flow for a Beneficiary to file a death claim and continue the account, at the stepped-up value is shown in FIG. 7 as initiated by the Beneficiary 590. Intermediary 512 submits a death claim form on behalf of the Beneficiary or the deceased Account Owner 510 estate. The Segregated Account Company 210 in association with the management company 220 determines 516 the new prospective Account Owner 510 eligibility 520 to continue the account at the step-up valuation. If the Account Owner 510a is eligible for the continuation of the account at a stepped-up level, the request is accepted and instructions to purchase assorted mutual funds in the amount of the stepped-up valuation are transmitted through a Segregated Account Company 210 trading agent to transfer agent 261. Transfer agent 261 then proceeds to purchase assorted mutual funds through fund managers 262. At this time, the Beneficiary 590 is the owner in the Preferred Shares of the Segregated Account Company 210.

On a given date, the Segregated Account Company 210 trading agent 271 communicates to Segregated Accounts Company 210 banking agent 281 to instruct Custodial Bank 233 to wire funds to mutual custodial banks 540 on a given trade date.

The method as recited further includes a death benefit claim having a stepped-up benefit upon liquidation comprising the steps of: initiating a claim by the Beneficiary of an account owner upon the death of the Account Owner, and submitting by the intermediary a request for redemption of shares in the Segregated Account Company, determining Beneficiary eligibility to liquidate the shares and if the Beneficiary is eligible for the redemption of shares, then liquidating the one or more funds in accordance with account owner instructions, by communicating to an agent to redeem the one or more funds. Thereafter, the transfer agent communicates to a custodial bank, to transfer sale proceeds to the Intermediary and whereby the Intermediary transfers funds to the Beneficiary.

Figure 8:
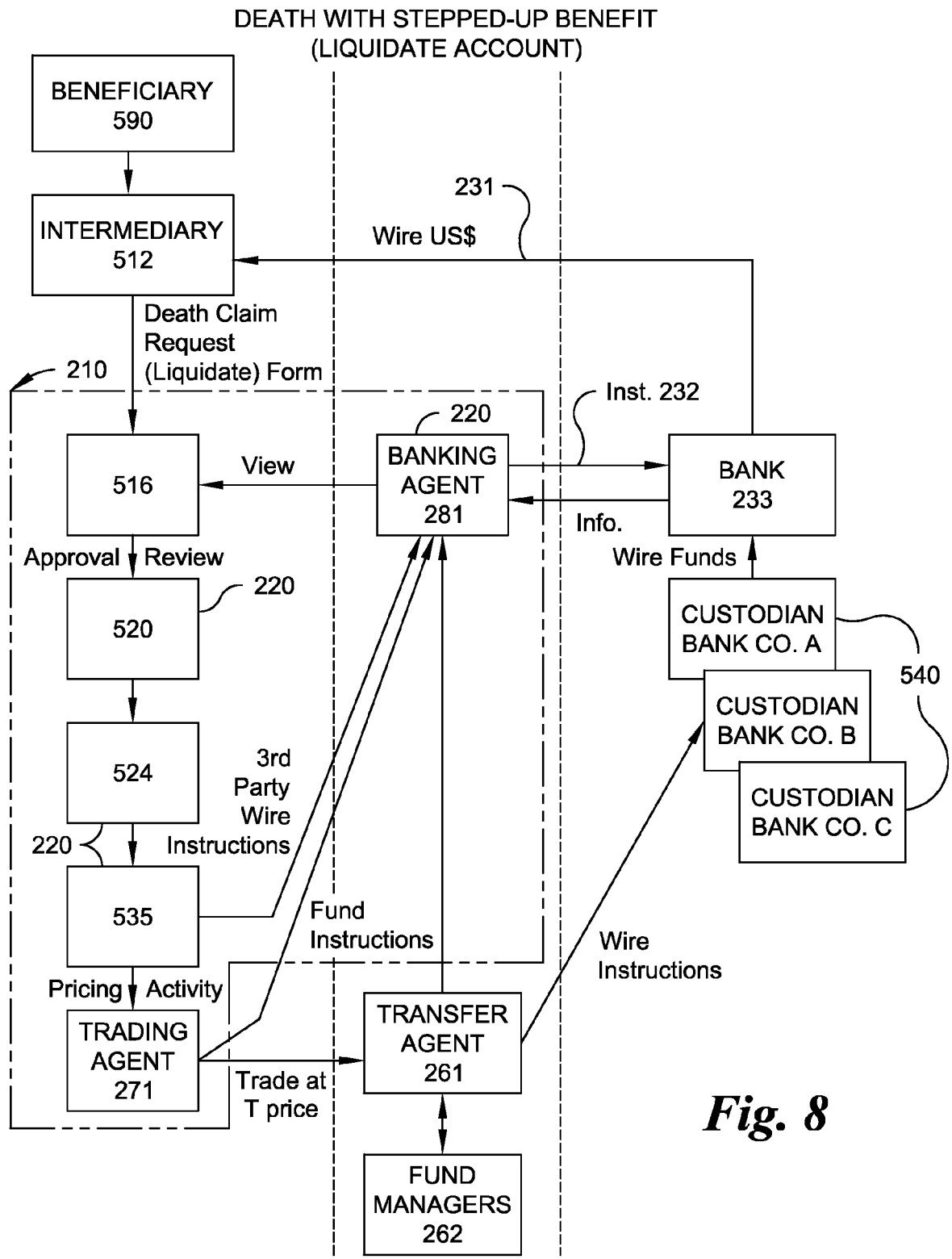
FIG. 8 illustrates a flow chart of an exemplary stepped-up death benefit with liquidation process in accordance an aspect of the invention, for the case in which the account is liquidated.

The death with stepped-up benefit with liquidation flow is shown in FIG. 8 wherein a Beneficiary 590 initiates a claim. Intermediary 512 submits a request for Peak Redemption of Preferred Shares in the Segregated Account, Company 210 on behalf of the Beneficiary 590. The Segregated Account Company 210 in association with the management company 220 determines 516 the Beneficiary 590 eligibility 520 to redeem or liquidate Preferred Shares. If the Beneficiary 590 is eligible for the Peak Redemption of Preferred Shares, the request is accepted and instructions to redeem assorted mutual funds in accordance with Beneficiary 590 instructions, are transmitted through a Segregated Account Company 210 trading agent to transfer agent 261. Transfer agent 261 then proceeds to redeem mutual funds through fund managers 262. Beneficiary 590 is not vested in the Preferred shares of the Segregated Account Company 210.

On a given trade, the mutual custodial banks 540 transfers the fund manager funds to the custodian bank 233 to cover the redemption order submitted by trading agent 271 on the given trade date.

On a given trade date, the Segregated Account. Company 210 trading agent 271 communicates to Segregated Accounts Company 210 banking agent 281 to instruct Custodial Bank 233 to wire funds to Intermediary 512.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A computer system for administering investments, comprising:
   a storage medium for storing data;
   a processor in communication with the storage medium, the processor being configured to:
   store in the storage medium data indicative of an amount of funds deposited by an investor with an intermediary for purchase of an equity interest in a segregated account company,
   store in the storage medium data indicative of instructions provided by the investor to the intermediary to purchase shares of an investor-selected one or more of a plurality of funds for crediting to an account of the segregated account company with the proceeds for the purchase of the equity interest;
   communicate an indication to furnish the instructions to an agent to purchase shares of the one or more funds and to credit the purchased shares to the segregated account company account.

2. The system as recited in claim 1, wherein the processor is further configured to:
   store in the storage medium data indicative of a subsequent deposit of funds by the investor with the intermediary for the purchase of a further equity interest in the segregated account company and instructions from the investor to purchase shares of one or more funds with the proceeds of the subsequent deposit; and
   communicate the instructions to an agent to purchase the shares of the one or more funds in accordance with the investor instructions and to credit the purchased shares to the segregated account company account.

3. The system as recited in claim 1, wherein the processor is further configured to:
   determine, responsive to receiving data indicative of a request submitted by an owner of the equity interest to the intermediary for redemption of the equity interest, eligibility of the owner to redeem the equity interest; and
   responsive to determining that the owner is eligible to redeem the equity interest, communicating by the processor to an agent a instruction to sell shares in the one or more funds corresponding to the redeemed equity interest.

4. The system as recited in claim 3, wherein the processor is further configured to communicate to the agent data indicative of instructions to transfer proceeds of the sale of the shares from the agent to the intermediary for transfer to the owner.

5. The system as recited in claim 1, wherein the processor is further configured to:
   responsive to receiving data indicative of death of the investor and beneficiary data, determine eligibility of the beneficiary to continue the account at a stepped-up valuation;
   responsive to determining that the beneficiary is eligible, communicate by to an agent instructions to purchase shares of one or more funds in an amount of the stepped-up valuation, and communicating the instructions to an agent to purchase the shares and to credit the purchased shares to the segregated account company account.

6. The system as recited in claim 1, wherein the processor is further configured to: receiving by the processor data indicative of death of the investor;
   responsive to receiving data indicative of death of the investor, beneficiary data, and data indicative of a request submitted by a beneficiary to the intermediary for redemption of the equity interest, determine whether the beneficiary is eligible to redeem the shares;
   responsive to determining that the beneficiary is eligible to redeem the shares, communicate to an agent instructions to redeem the shares in the one or more funds corresponding to the shares.

7. The system as recited in claim 1, wherein the processor is further configured to, responsive to receiving instructions from the investor to exchange the purchased shares for shares of another fund, determine if the investor is eligible to exchange the shares, and responsive to determining that the investor is eligible to exchange the shares, provide instructions to an agent to sell the purchased shares and purchase share of the another fund in accordance with the investor instructions.

8. A computer-implemented method for administering investments, comprising the steps of:
   storing by a processor in a storage medium data indicative of an amount of funds deposited by an investor with an intermediary for purchase of an equity interest in a segregated account company,
   storing by the processor in the storage medium data indicative of instructions provided by the investor to the intermediary to purchase shares of an investor-selected one or more of a plurality of funds for crediting to an account of the segregated account company with the proceeds for the purchase of the equity interest;

communicating by the processor an indication to furnish the instructions to an agent to purchase shares of the one or more funds in accordance with the investor instructions and to credit the purchased shares to the segregated account company account.

9. The method as recited in claim 8 further comprising:
storing by the processor in the storage medium data indicative of a subsequent deposit of funds by the investor with the intermediary for the purchase of a further equity interest in the segregated account company and instructions to purchase shares of one or more funds with the proceeds of the subsequent deposit; and
communicating by the processor the instructions to an agent to purchase the shares of the one or more funds and to credit the purchased shares to the segregated account company account.

10. The method as recited in claim 8, further comprising:
responsive to a request by an owner of the equity for redemption of the equity interest in the segregated account company, determining by the processor eligibility of the owner to redeem the equity interest; and
responsive to determining that the owner is eligible to redeem the equity interest, communicating by the processor to an agent a instruction to sell shares in the one or more funds corresponding to the redeemed equity interest.

11. The method as recited in claim 10, further comprising communicating by the processor to the agent data indicative of instructions to transfer proceeds of the sale of the shares from the agent to the intermediary for transfer to the owner.

12. The method as recited in claim 8, further comprising;
receiving by the processor data indicative of death of the investor;
determining eligibility of the beneficiary to continue the account at a stepped-up valuation;
responsive to determining that the beneficiary is eligible, communicating by the processor to an agent instructions to purchase shares of one or more funds in an amount of the stepped-up valuation, and communicating the instructions to an agent to purchase the shares and to credit the purchased shares to the segregated account company account.

13. The method as recited in claim 8, further comprising:
receiving by the processor data indicative of death of the investor;
receiving by the processor data indicative of a request submitted by a beneficiary to the intermediary for redemption of the equity interest;
determining by the processor whether the beneficiary is eligible to redeem the shares;
responsive to determining that the beneficiary is eligible to redeem the shares, communicating by the processor to an agent instructions to redeem the shares in the one or more funds corresponding to the shares.

14. The method as recited in claim 13, further comprising communicating by the agent instructions to a custodian bank to transfer proceeds of sale of the shares to the intermediary.

15. The method as recited in claim 8, further comprising receiving by the processor instructions from the investor to exchange the purchased shares for shares of another fund, determining by the processor if the investor is eligible to exchange the shares, and responsive to determining that the investor is eligible to exchange the shares, providing instructions to an agent to sell the purchased shares and purchase share of the another fund in accordance with the investor instructions.

16. A computer-readable medium having computer-executable instructions stored thereon, which instructions, when executed by a processor, cause the processor to:
store in a storage medium data indicative of an amount of funds deposited by an investor with an intermediary for purchase of an equity interest in a segregated account company,
store in the storage medium data indicative of instructions provided by the investor to the intermediary to purchase interests in an investor-selected one or more of a plurality of investments for crediting to an account of the segregated account entity with the proceeds for the purchase of the equity interest; and
communicate an indication to furnish the instructions to an agent to purchase interests in the one or more investments and to credit the purchased interests to the segregated account entity account.

17. The computer-readable medium of claim 16, wherein the instructions further cause the processor to:
store in the storage medium data indicative of a subsequent deposit of funds by the investor with the intermediary for the purchase of a further equity interest in the segregated account entity and instructions from the investor to purchase interests in one or more investments with the proceeds of the subsequent deposit; and
communicate the instructions to an agent to purchase the interests in accordance with the investor instructions and to credit the purchased interests to the segregated account entity account.

18. The computer-readable medium of claim 16, wherein the equity interest in the segregated account entity comprise preferred shares, and the interests in the investments comprise shares of mutual funds.

19. The computer-readable medium of claim 16, wherein the instructions further cause the processor to:
responsive to receiving instructions from the investor to exchange the purchased interests for interests in another investment, determine if the investor is eligible to exchange the interests, and responsive to determining that the investor is eligible to exchange the interests, provide instructions to an agent to sell the purchased interests and purchase the interests in the another investment in accordance with the investor instructions.

20. The computer-readable medium of claim 16, wherein the instructions further cause the processor to:
store in the storage medium data indicative of a subsequent deposit of funds by the investor with the intermediary for the purchase of a further equity interest in the segregated account entity and instructions from the investor to purchase interests in one or more investments with the proceeds of the subsequent deposit; and
communicate the instructions to an agent to purchase the interests in the one or more investments in accordance with the investor instructions and to credit the purchased interests to the segregated account entity account.

* * * * *